US011589513B2

(12) United States Patent
Reese

(10) Patent No.: US 11,589,513 B2
(45) Date of Patent: Feb. 28, 2023

(54) INTEGRATED PARK BRAKE SYSTEM FOR A RIDING LAWN CARE VEHICLE

(71) Applicant: HUSQVARNA AB, Huskvarna (SE)

(72) Inventor: Braxton W. Reese, Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 888 days.

(21) Appl. No.: 16/480,486

(22) PCT Filed: May 16, 2018

(86) PCT No.: PCT/IB2018/053437
§ 371 (c)(1),
(2) Date: Jul. 24, 2019

(87) PCT Pub. No.: WO2018/211436
PCT Pub. Date: Nov. 22, 2018

(65) Prior Publication Data
US 2020/0000039 A1 Jan. 2, 2020

Related U.S. Application Data

(60) Provisional application No. 62/506,879, filed on May 16, 2017.

(51) Int. Cl.
*A01D 69/10* (2006.01)
*A01D 34/00* (2006.01)
(Continued)

(52) U.S. Cl.
CPC .......... *A01D 69/10* (2013.01); *A01D 34/006* (2013.01); *A01D 34/64* (2013.01); *B62D 11/006* (2013.01); *A01D 2101/00* (2013.01)

(58) Field of Classification Search
CPC ...... A01D 69/10; A01D 34/006; A01D 34/64; A01D 2101/00; B62D 11/006
See application file for complete search history.

(56) References Cited

U.S. PATENT DOCUMENTS 6,729,115 B2    5/2004  Bartel
8,240,420 B1 *  8/2012  Bartel ................. B62D 11/006
                                                    180/315
(Continued)

FOREIGN PATENT DOCUMENTS

WO    2015/169381 A1    11/2015

OTHER PUBLICATIONS

International Search Report and Written Opinion for International Application No. PCT/IB2018/053437 dated Aug. 28, 2018.

*Primary Examiner* — Jacob D Knutson
*Assistant Examiner* — Marlon A Arce
(74) *Attorney, Agent, or Firm* — Burr & Forman, LLP

(57) ABSTRACT

A riding lawn care vehicle may include a frame, a steering assembly, a first brake assembly, and a first biasing assembly. A first drive wheel and a second drive wheel of the riding lawn care vehicle are operably coupled to the frame. The steering assembly includes a first steering lever and a second steering lever. The first and second steering levers are operably coupled to corresponding ones of the first and second drive wheels via a first hydraulic motor and a second hydraulic motor, respectively, to facilitate turning of the riding lawn care vehicle based on drive speed control of the first and second drive wheels responsive to positioning of the first and second steering levers to control the first and second hydraulic motors. The first brake assembly is operably coupled to the first hydraulic motor to enable a braking force to be selectively applied to a motor shaft of the first hydraulic motor responsive to movement of the first steering lever from an inboard position to an outboard position. The first biasing assembly is configured to positively assist movement of the first steering lever between the inboard and outboard positions in both directions.

16 Claims, 14 Drawing Sheets

(51) Int. Cl.
    *A01D 34/64*     (2006.01)
    *B62D 11/00*     (2006.01)
    *A01D 101/00*     (2006.01)

(56) References Cited

U.S. PATENT DOCUMENTS

| | | | |
|---|---|---|---|
| 8,250,862 B1 * | 8/2012 | Iida | F16D 55/28 60/487 |
| 8,857,558 B2 * | 10/2014 | Poe | A01D 69/10 180/370 |
| 10,414,436 B1 * | 9/2019 | Bonny | A01D 69/02 |
| 10,681,867 B2 * | 6/2020 | Dunbar | A01D 69/10 |
| 10,836,426 B1 * | 11/2020 | Busboom | B62D 11/04 |
| 11,172,604 B2 * | 11/2021 | Yang | G01D 5/16 |
| 2006/0174601 A1 | 8/2006 | Piontek | |
| 2017/0086376 A1 * | 3/2017 | Burns | A01D 34/64 |

* cited by examiner

INTEGRATED PARK BRAKE SYSTEM FOR A RIDING LAWN CARE VEHICLE

CROSS REFERENCE TO RELATED APPLICATION

This application claims priority to U.S. application No. 62/506,879 filed May 16, 2017, the entire contents of which are hereby incorporated by reference in its entirety.

TECHNICAL FIELD

Example embodiments generally relate to lawn care vehicles and, more particularly, to brake systems (e.g., parking brake systems) for riding lawn care vehicles.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

By their very nature, riding lawn mowers include steering assemblies that are used to direct the movement of the riding lawn mowers. The steering assemblies often take the familiar form of a steering wheel. However, handlebar assemblies have also been used in some cases. More recently, some mowers have been provided with very short (e.g., near zero) turning radiuses. Such mowers have employed separate steering levers that interface with the drive wheels on each respective side of the mower.

The steering levers are typically disposed substantially in front of the operator to enable the operator to grasp and operate the steering levers (e.g., from a seated position). The steering levers are then movable in forward and rearward directions to turn the respective wheels in corresponding directions to control movement of the riding lawn mower. However, when the riding lawn mower is not being operated, such as when the operator intends to park the mower, it may be desirable to provide a convenient and effective mechanism by which to employ a parking brake.

BRIEF SUMMARY OF SOME EXAMPLES

Some example embodiments of the present invention provide steering levers on a riding lawn care vehicle that are movable to an outboard position to activate a brake assembly. However, rather than having the braking applied directly to the wheels of the vehicle, some example embodiments may apply braking forces indirectly by instead applying braking forces through the transmission of the vehicle.

In one example embodiment, a riding lawn care vehicle is provided. The riding lawn care vehicle may include a frame, a steering assembly, a first brake assembly, and a first biasing assembly. A first drive wheel and a second drive wheel of the riding lawn care vehicle may be operably coupled to the frame. The steering assembly may include a first steering lever and a second steering lever. The first and second steering levers may be operably coupled to corresponding ones of the first and second drive wheels via a first hydraulic motor and a second hydraulic motor, respectively, to facilitate turning of the riding lawn care vehicle based on drive speed control of the first and second drive wheels responsive to positioning of the first and second steering levers to control the first and second hydraulic motors. The first brake assembly may be operably coupled to the first hydraulic motor to enable a braking force to be selectively applied to a motor shaft of the first hydraulic motor responsive to movement of the first steering lever from an inboard position to an outboard position. The first biasing assembly may be configured to positively assist movement of the first steering lever between the inboard and outboard positions in both directions.

In another example embodiment, a biasing assembly of a riding lawn care vehicle is provided. The riding lawn care vehicle includes first and second drive wheels, first and second steering levers, first and second hydraulic motors, and first and second brake assemblies. The first and second brake assemblies may be operably coupled to the first and second hydraulic motors to enable a braking force to be selectively applied to a motor shaft of the first and second hydraulic motors responsive to movement of the first and second steering levers, respectively, from an inboard position to an outboard position. The riding lawn care vehicle may be steerable via the first and second steering levers to facilitate turning of the riding lawn care vehicle based on drive speed control of the first and second drive wheels responsive to positioning of the first and second steering levers while in the inboard position. The biasing assembly may include a first portion configured to positively assist movement of the first and second steering levers from the inboard to the outboard position, and a second portion configured to positively assist movement of the first and second steering levers from the outboard to the inboard position.

Some example embodiments may improve an operator's experience in relation to applying the brakes of a lawn care vehicle for starting, dismounting, and/or transporting the vehicle. The user experience associated with operating and transporting the riding lawn care vehicle may therefore also be improved.

BRIEF DESCRIPTION OF THE SEVERAL VIEWS OF THE DRAWING(S)

Having thus described some embodiments of the present invention in general terms, reference will now be made to the accompanying drawings, which are not necessarily drawn to scale, and wherein:

Figure 4A:
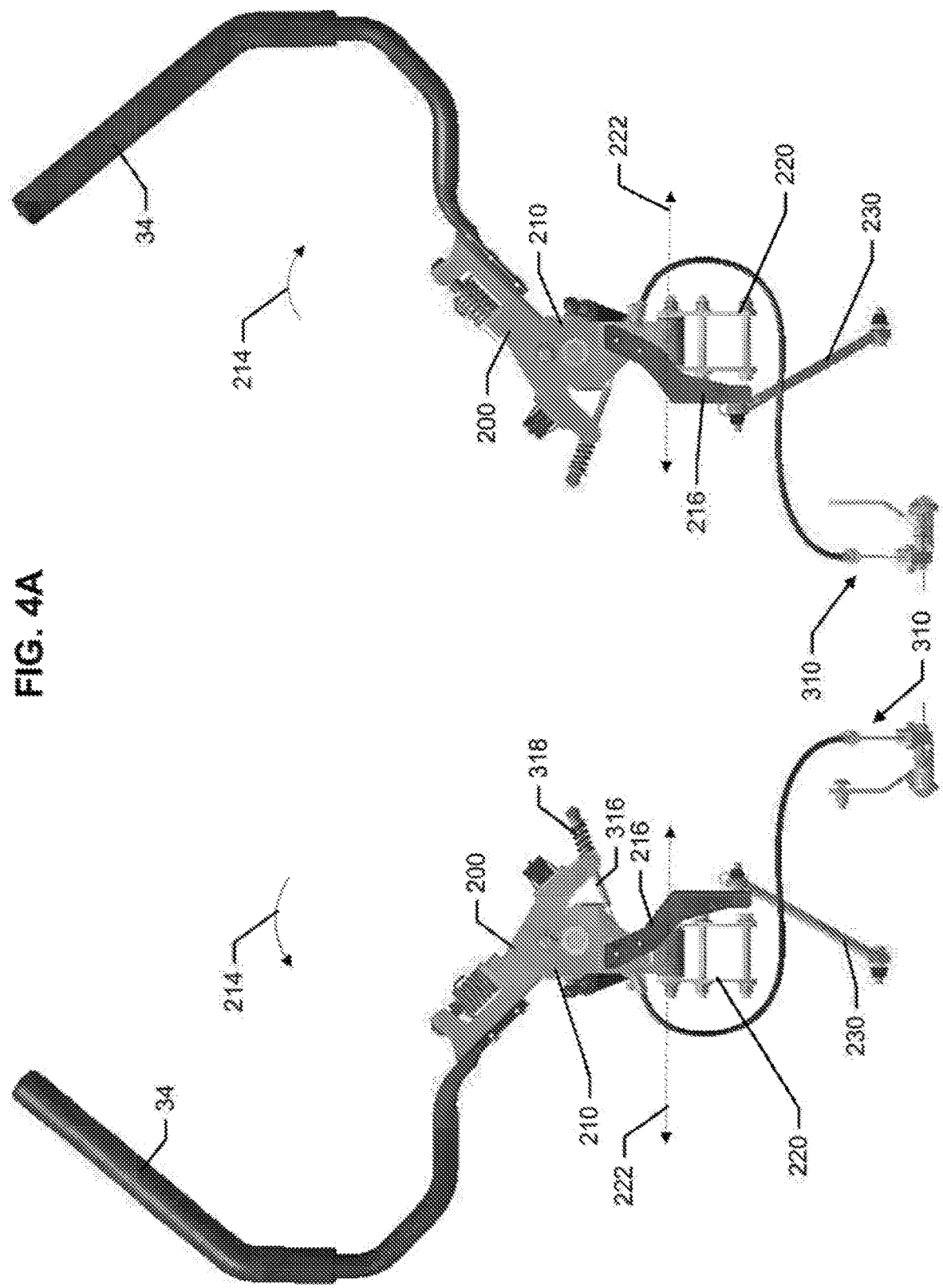
Figure 4B:
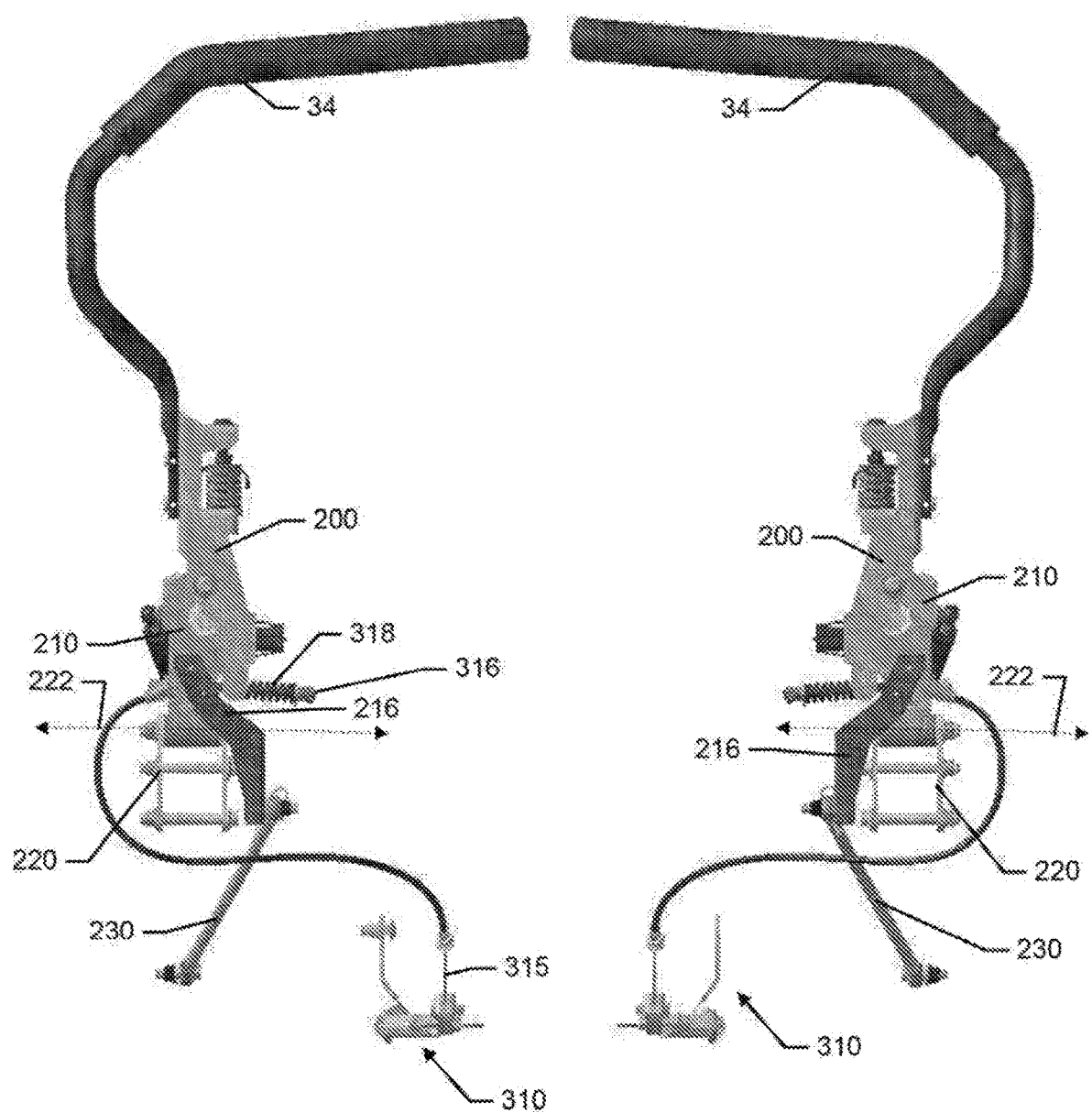
Figure 5A:
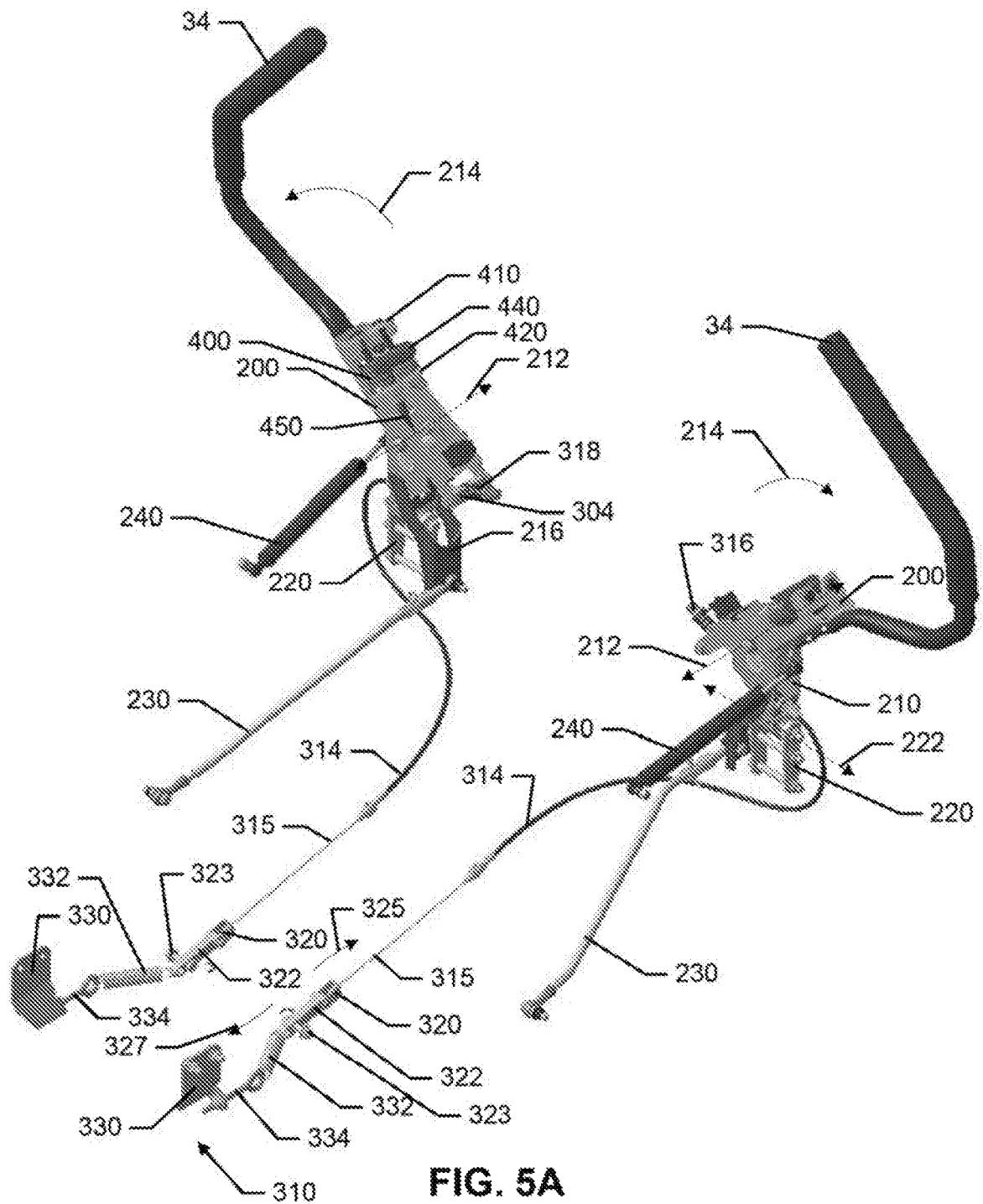
Figure 5B:
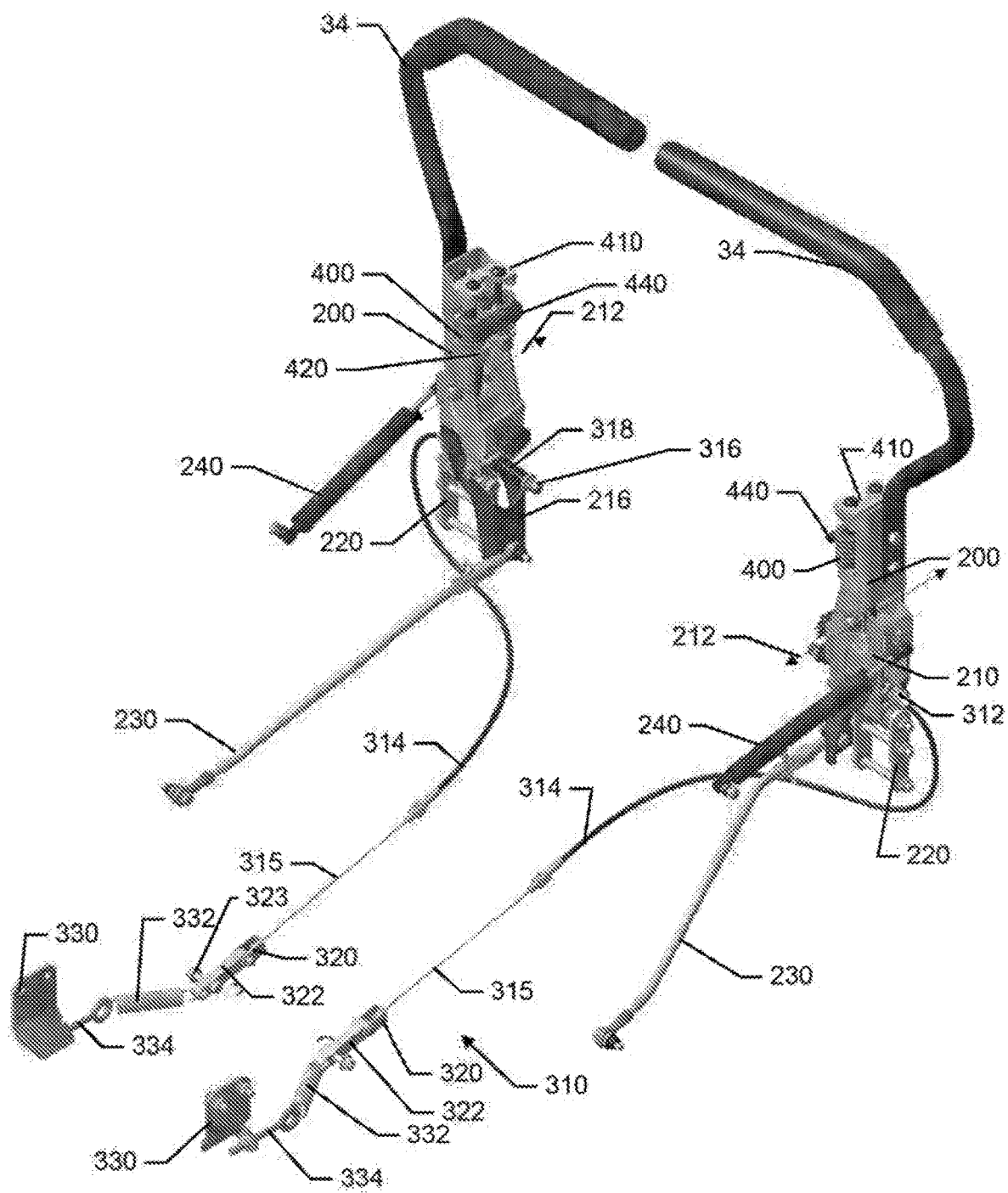
Figure 6A:
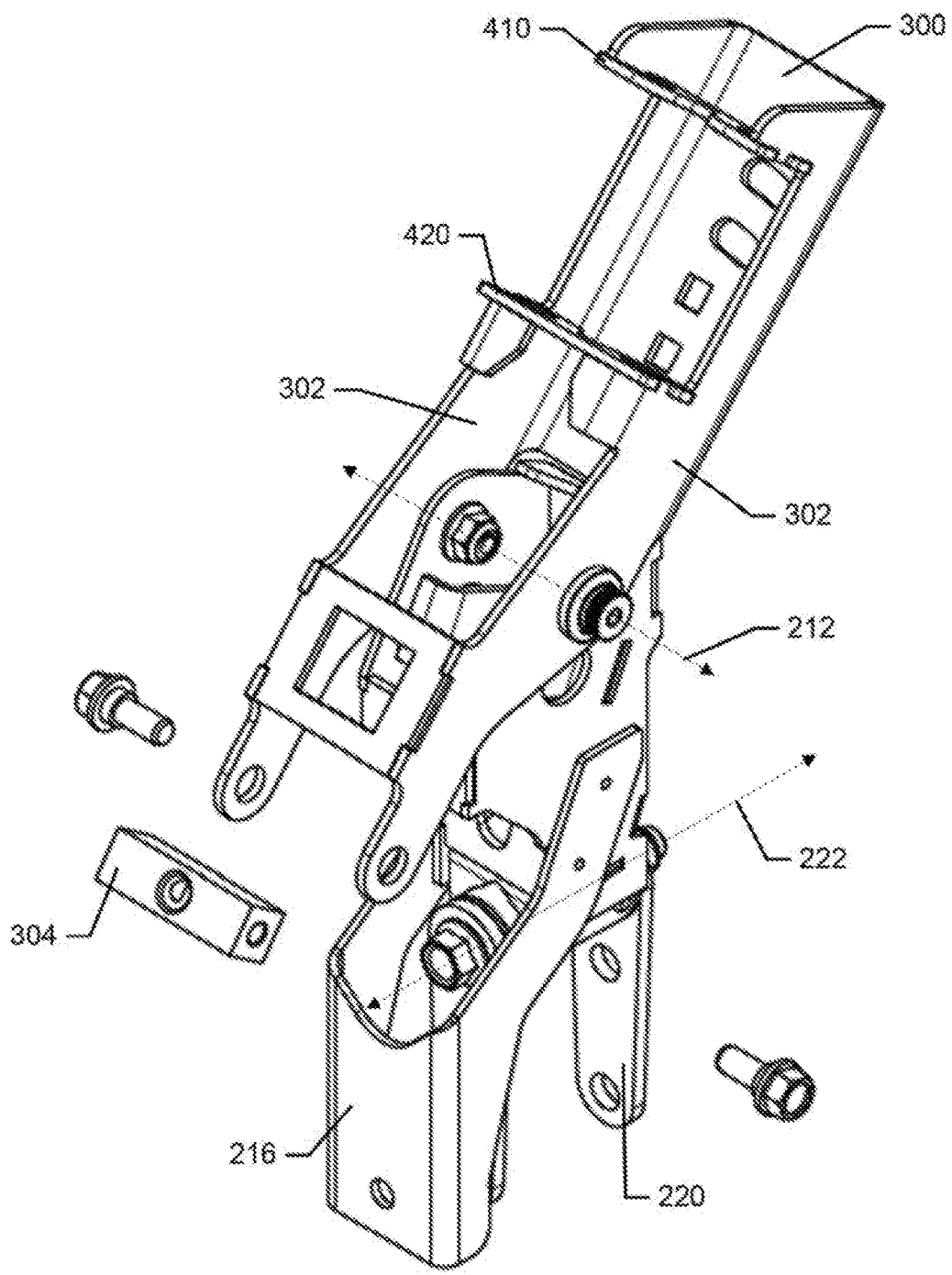
Figure 6B:
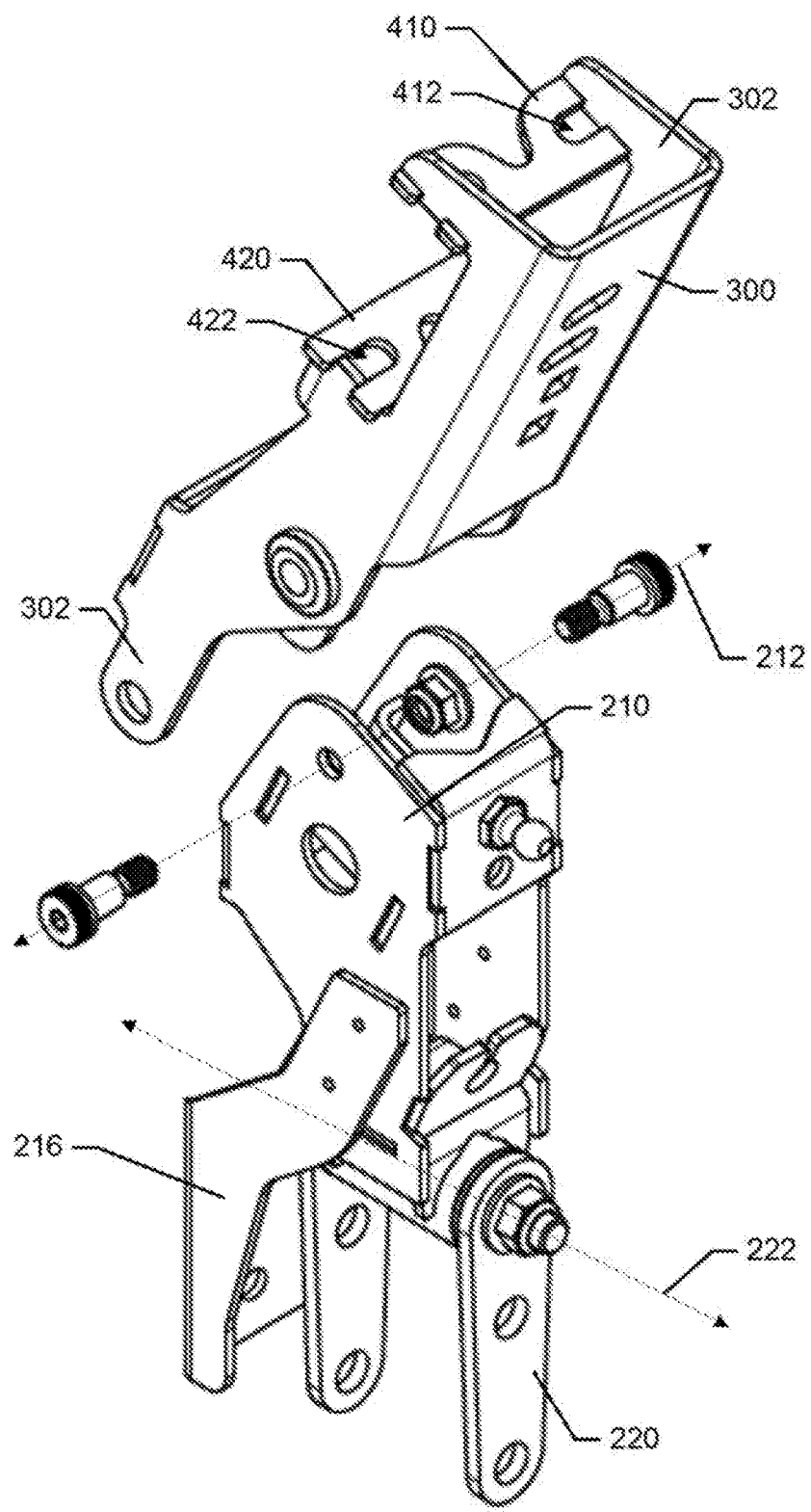
Figure 7:
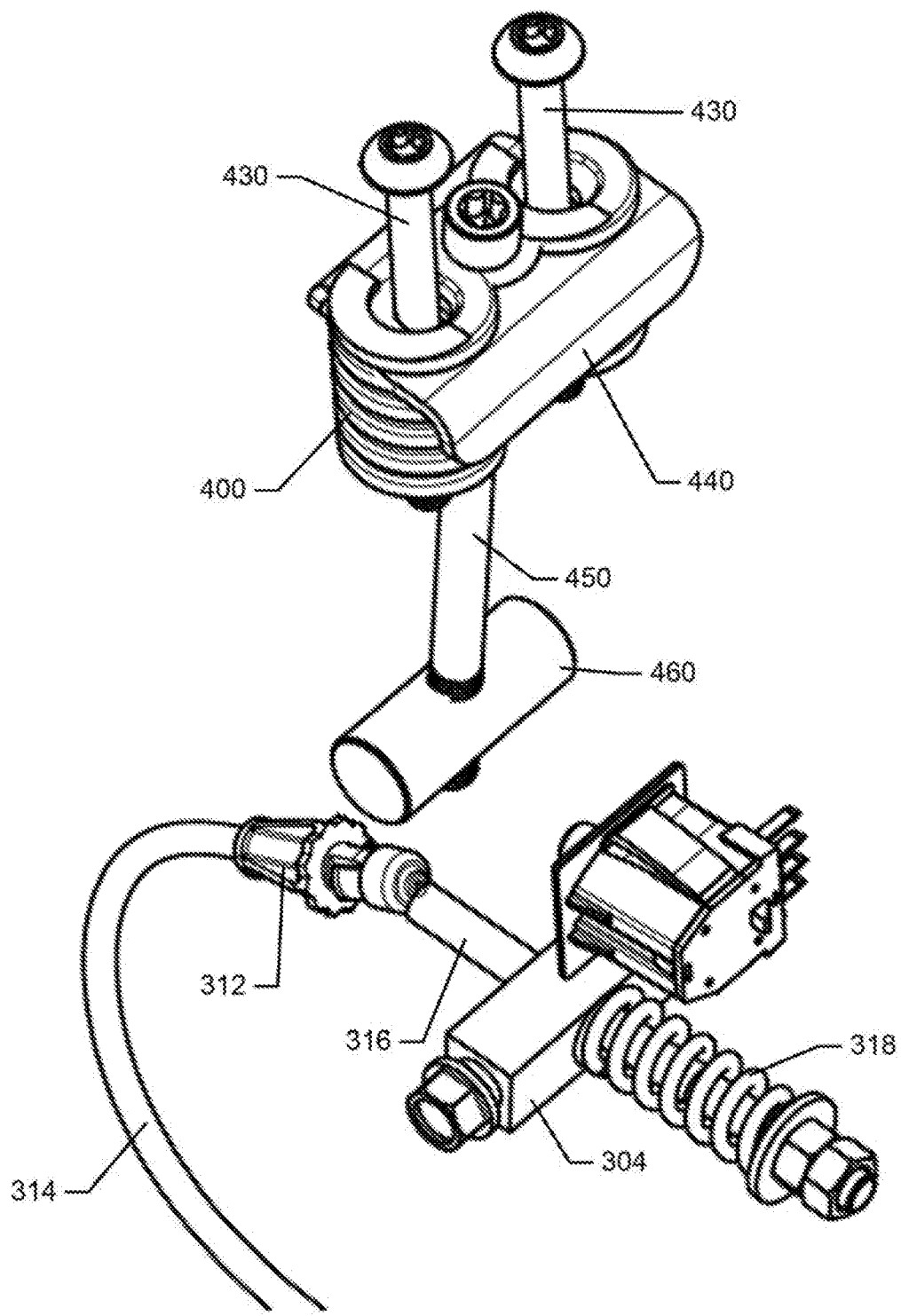
Figure 8:
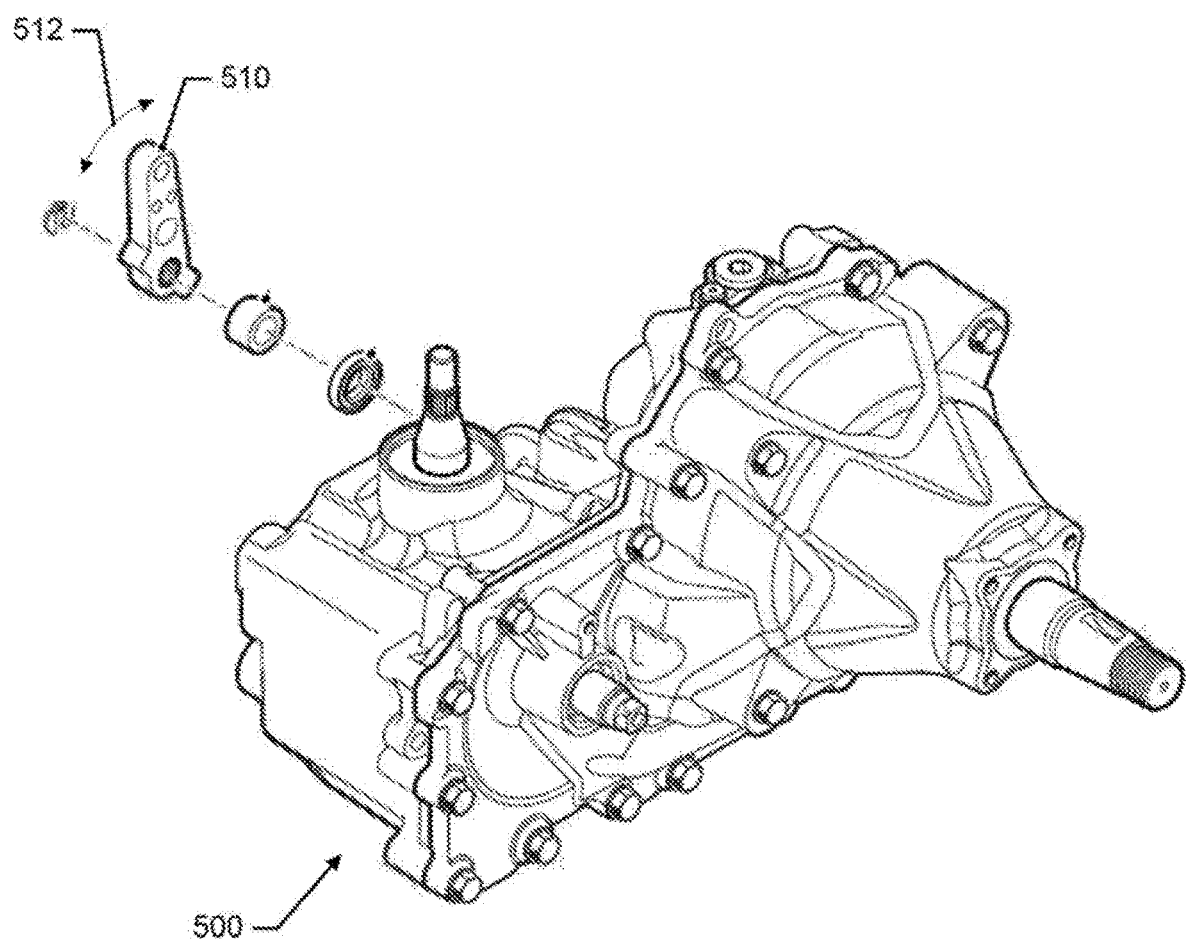
Figure 9:
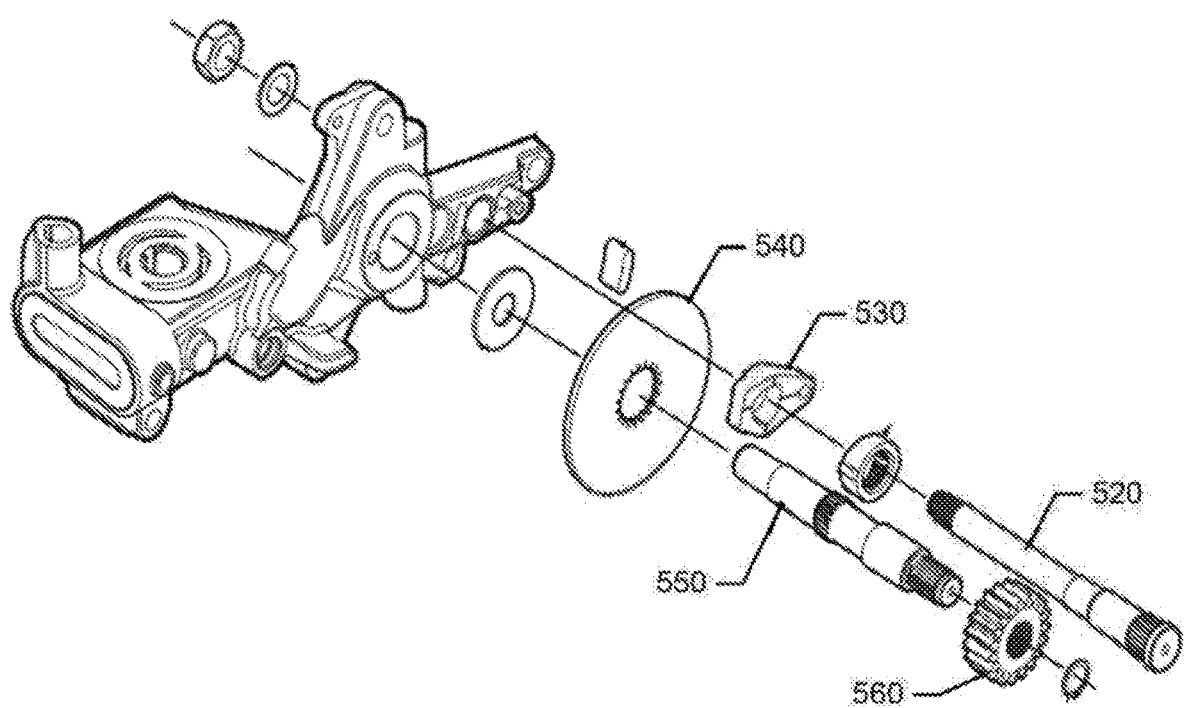
Figure 10:
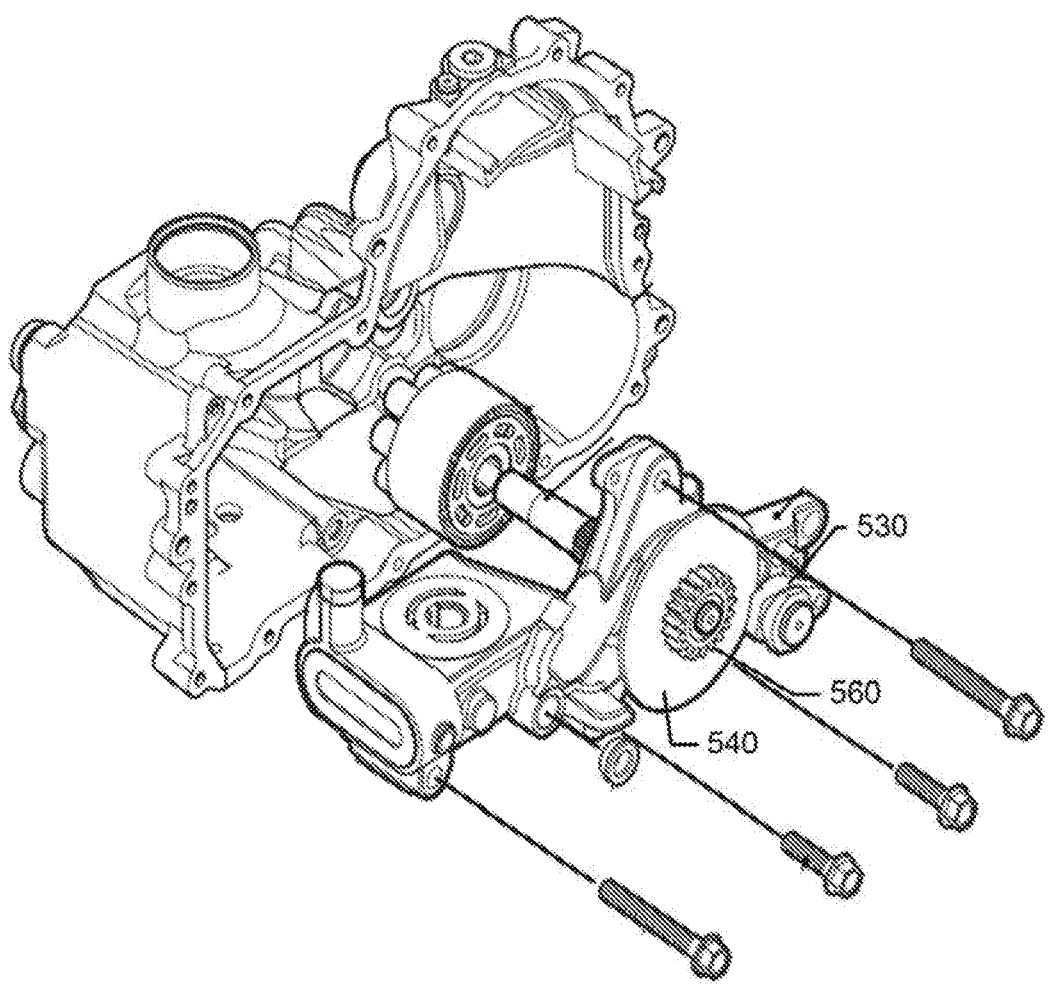

FIG. 4, which is defined by FIGS. 4A and 4B, illustrates an isolation view of the steering levers and components of a lever mount from the front to show some isolated components of the lever mount in accordance with an example embodiment;

FIG. 5, which is defined by FIGS. 5A and 5B, illustrates a perspective view of the steering levers and components of the lever mount in isolation in accordance with an example embodiment FIG. 6, which is defined by FIGS. 6A and 6B, shows different exploded perspective views of the connection between upper and lower pivot carriers of the lever mount in accordance with an example embodiment;

FIG. 7 illustrates an isolation view of biasing components associated with positioning of the steering levers in accordance with an example embodiment;

FIG. 8 shows a perspective view of a hydraulic motor with components of the park brake exploded in accordance with an example embodiment;

FIG. 9 illustrates an exploded perspective view of a motor shaft and brake shaft in accordance with an example embodiment; and FIG. 10 illustrates a partially exploded perspective view of some other portions of the motor and brake assembly in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the phrase "operable coupling" and variants thereof should be understood to relate to direct or indirect connection that, in either case, enables functional interconnection of components that are operably coupled to each other.

Some example embodiments may improve the ability of an operator to apply, engage, actuate, and/or otherwise activate brakes of lawn care vehicles such as, for example, riding lawn mowers. In this regard, some example embodiments may provide a steering assembly and brake assembly for use on a lawn care vehicle to apply brakes to the drive wheels via the transmission when the steering levers are moved outboard. However, example embodiments may provide a structure for doing so in a way that provides a quality feel (i.e., less "play") for the steering levers in both the inboard position and in the outboard position by further employing a biasing assembly. The brakes may therefore be easily applied to facilitate dismounting, transporting, and/or starting of the vehicle while applying, for example, the parking brake. Moreover, when the brake is applied, and when the brake is not applied, the steering levers may feel secure in their respective positions.

Figure 1A:
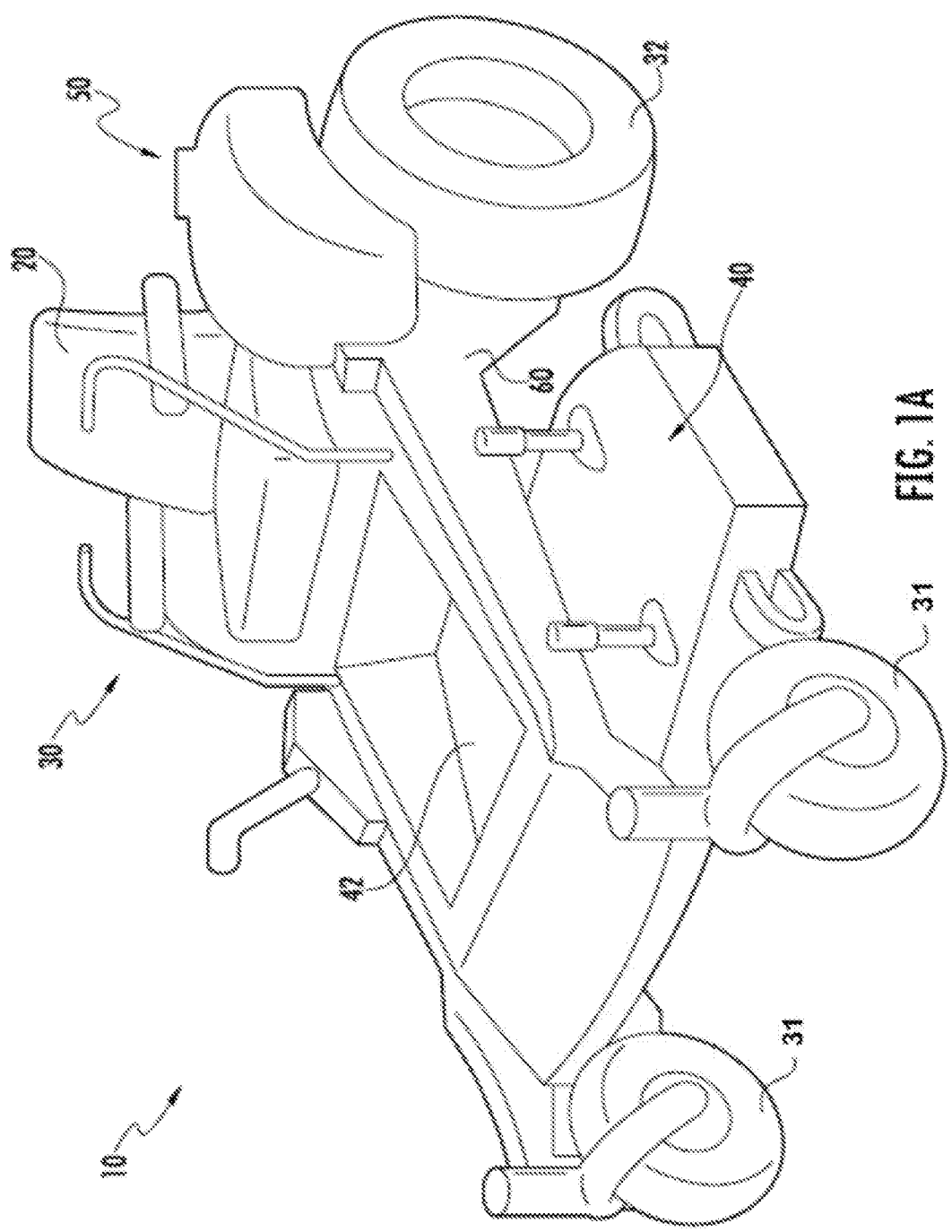
FIG. 1A illustrates a perspective view of a riding lawn care vehicle according to an example embodiment.
Figure 1B:
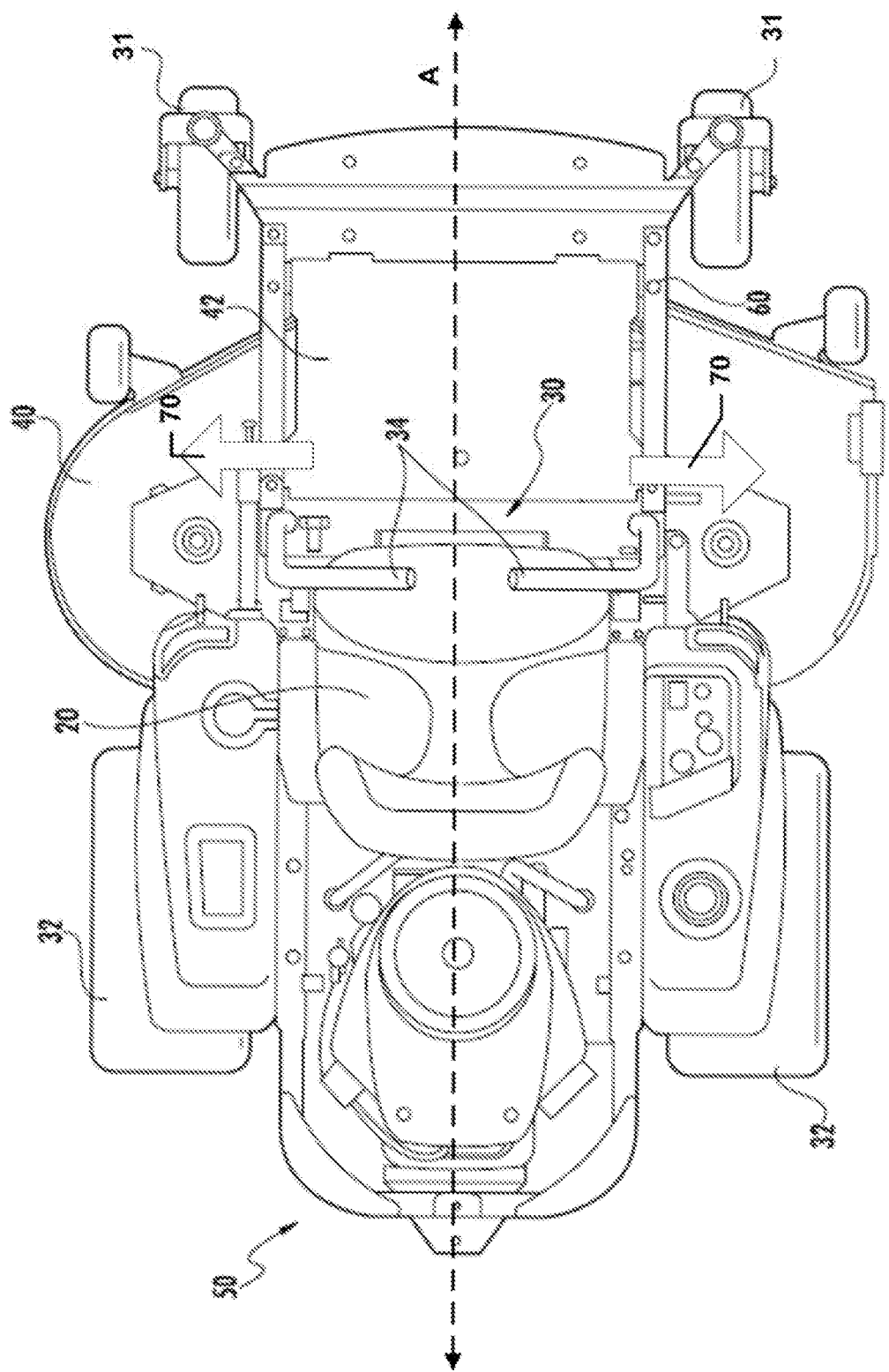
FIG. 1B illustrates a top view of the riding lawn care vehicle according to an example embodiment.

FIG. 1, which includes FIGS. 1A and 1B, illustrates a riding lawn care vehicle 10 according to an example embodiment. FIG. 1A illustrates a perspective view of the riding lawn care vehicle 10, and FIG. 1B illustrates a top view of the riding lawn care vehicle 10 according to an example embodiment. The riding lawn care vehicle 10 of FIGS. 1A and 1B may be recognized as an example from a class of riding lawn mowers that is often referred to as a "zero turn" mower. In some embodiments, the riding lawn care vehicle 10 may include a seat 20 that may be disposed at a center, rear, or front portion of the riding lawn care vehicle 10. The riding lawn care vehicle 10 may also include a steering assembly 30 (e.g., a set of steering levers or the like) functionally connected to wheels 31 and/or 32 of the riding lawn care vehicle 10 to allow the operator to steer the riding lawn care vehicle 10. The operator may sit on the seat 20, which may be disposed to the rear of the steering assembly 30 to provide input for steering of the riding lawn care vehicle 10 via the steering assembly 30. However, some models may be stand-up models that eliminate the seat 20. If the seat 20 is eliminated, the operator may stand at an operator station proximate to the steering assembly 30.

In an example embodiment, the steering assembly 30 may include separately operable steering levers 34. The riding lawn care vehicle 10 may also include a cutting deck 40 having at least one cutting blade (e.g., two or three cutting blades) mounted therein. The cutting deck 40 may be positioned substantially rearward of a pair of front wheels 31 and substantially forward of a pair of rear wheels 32 in a position to enable the operator to cut grass using the cutting blade(s) when the cutting blade(s) are rotated below the cutting deck 40 when the cutting deck 40 is in a cutting position. However, in some alternative examples, the cutting deck 40 may be positioned in front of the front wheels 31. In some embodiments, a footrest 42 may also be positioned above the cutting deck 40 forward of the seat 20 to enable the operator to rest his or her feet thereon while seated in the seat 20. In embodiments that do not include the seat 20, the footrest 42 may form the operator station from which a standing operator controls the riding lawn care vehicle 10. When operating to cut grass, the grass clippings may be captured by a collection system, mulched, or expelled from the cutting deck 40 via either a side discharge or a rear discharge.

In the pictured example embodiment, an engine 50 of the riding lawn care vehicle 10 is disposed to the rear of a seated operator. However, in other example embodiments, the engine 50 could be in different positions such as in front of or below the operator. As shown in FIGS. 1A and 1B, the engine 50 may be operably coupled to one or more of the wheels 31 and/or 32 to provide drive power for the riding lawn care vehicle 10. The engine 50 is an example of one power unit (e.g., a petrol engine) that could power the riding lawn care vehicle 10, but other power units (e.g., an electric motor) may be used in other example embodiments. The engine 50, the steering assembly 30, the cutting deck 40, the seat 20, and other components of the riding lawn care vehicle 10 may be operably coupled to a frame 60 of the riding lawn care vehicle 10. The frame 60 may be a rigid structure configured to provide support, connectivity, and/or interoperability functions for various ones of the components of the riding lawn care vehicle 10.

In some example embodiments, the steering assembly 30 may be embodied as an assembly of metallic and/or other rigid components that may be welded, bolted, and/or otherwise attached to each other and operably coupled to the wheels of the riding lawn care vehicle 10 to which steering inputs are provided (e.g., rear wheels 32). For example, the steering assembly 30 may include or otherwise be coupled with hydraulic motors that independently power one or more drive wheels (e.g., rear wheels 32) on each respective side of the riding lawn care vehicle 10. When one of the steering levers 34 is pushed forward (e.g., away from the operator), the corresponding hydraulic motor may drive the corresponding wheel forward. When a steering lever 34 is pulled rearward (e.g., toward the operator as shown by the directional arrows 68 in FIG. 2), the corresponding hydraulic motor may drive the corresponding wheel (i.e., a corresponding one of the rear wheels 32) rearward. Thus, when both steering levers 34 are pushed forward the same amount, the riding lawn care vehicle 10 travels forward in substantially a straight line because approximately the same amount of forward drive input is provided to each drive wheel. When both steering levers 34 are pulled rearward the same amount, the riding lawn care vehicle 10 travels backward (e.g., rearward) in substantially a straight line because approximately the same amount of rearward drive input is provided to each drive wheel. When one steering lever 34 is pushed forward and the other steering lever 34 is pulled back, the riding lawn care vehicle 10 begins to turn in a circle and/or spin. Steering right and left may be accomplished by providing uneven amounts of input to the steering levers 34. Other steering control systems may be employed in some alternative embodiments.

Figure 2:
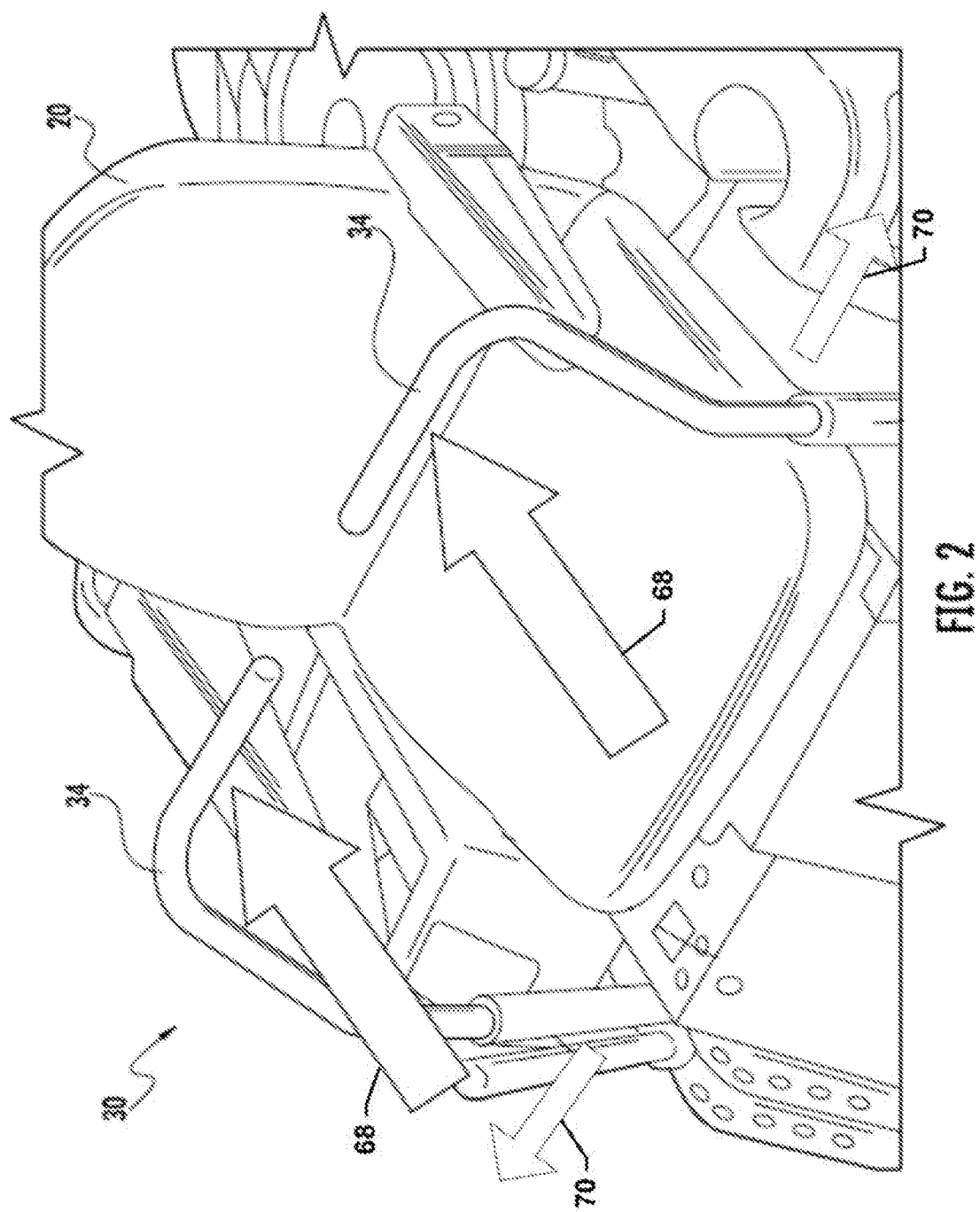
FIG. 2 illustrates a perspective view of a steering assembly with steering levers positioned to be pulled back for rearward propulsion according to an example embodiment.

Although the steering levers 34 are generally moved forward (i.e., opposite the direction of the arrows shown in FIG. 2) or rearward (i.e., in the direction of the arrows shown in FIG. 2) in any desirable combination while they are in the operating positions shown in FIGS. 1 and 2, it should be appreciated that the steering levers 34 may also be moved to an outboard position (e.g., in a non-operational state) by moving the steering levers 34 outwardly in the direction shown by arrows 70 in FIGS. 1B and 2. In this regard, each of the steering levers 34 may be operably coupled to respective lever mounts that may pivot to enable the steering levers 34 to move outwardly (e.g., to the outboard position) or inwardly (e.g., to an inboard and/or operating position). In some embodiments, when at least one of the steering levers 34 is pivoted outwardly, the operator may easily mount or dismount the riding lawn care vehicle 10 and sit in or leave the seat 20.

In many conventional riding lawn care vehicles, a brake lever separate and distinct from the steering assembly is provided to interface with the brake assembly of the riding lawn care vehicle 10. The brake lever may apply braking forces directly to the wheels (e.g., the rear wheels 32) of the riding lawn care vehicle 10. In contrast, example embodiments of the present invention may provide for the setting of the brake assembly via applying braking in the transmission. Moreover, the interface between the steering assembly 30 (e.g., steering levers 34) and the brake assembly may be provided to give the steering assembly 30 a quality feel that lacks excessive play when moved in any direction.

Figure 3:
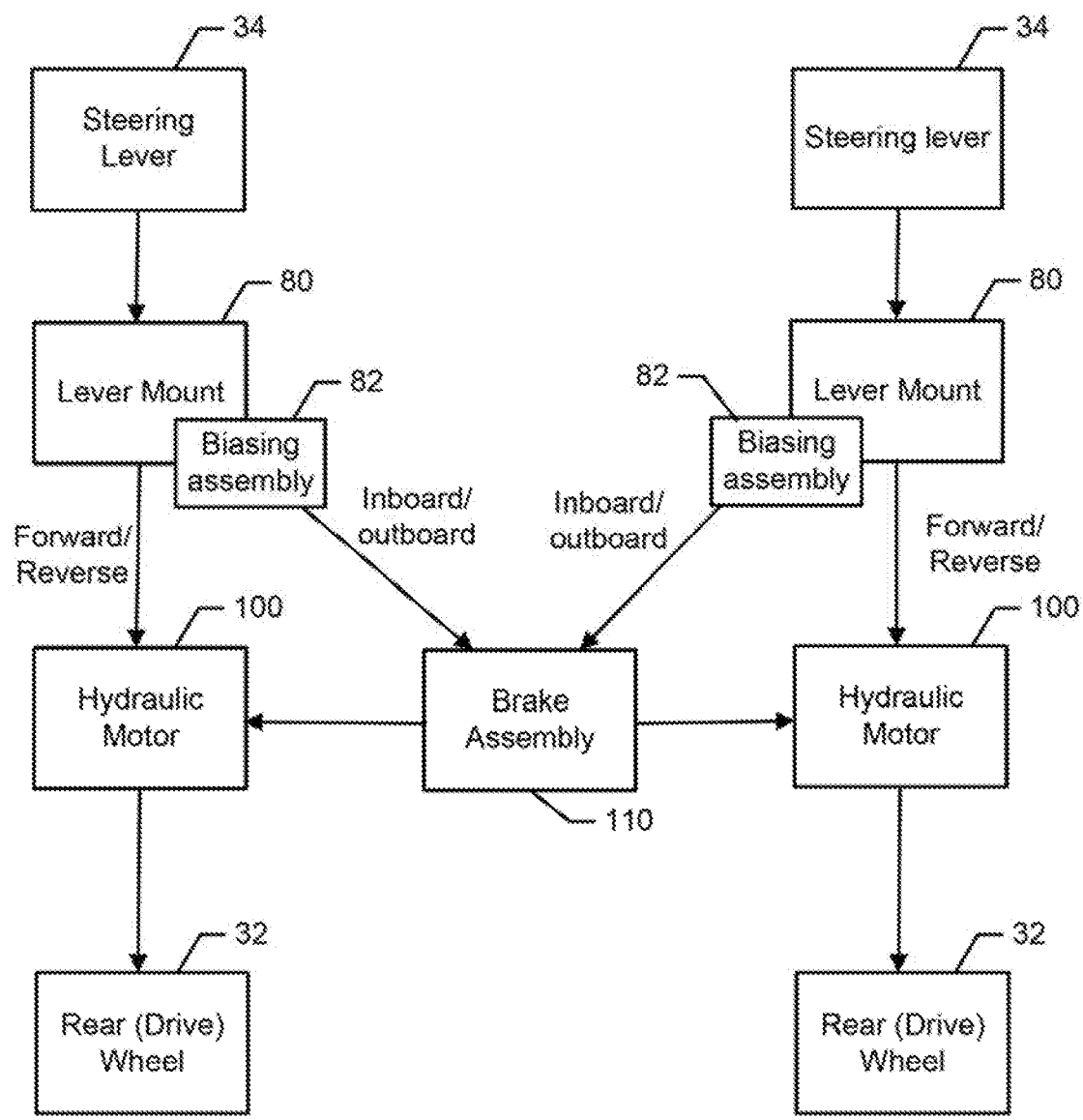
FIG. 3 illustrates a block diagram of some steering and braking components according to an example embodiment.

FIG. 3 illustrates a block diagram of some steering and braking components of an example embodiment. As shown in FIG. 3, each one of the steering levers 34 may be operably coupled to a corresponding lever mount 80. The lever mounts 80 may be operably coupled to corresponding hydraulic motors 100 that power respective ones of the drive wheels (e.g., the rear wheels 32). A brake system including a brake assembly 110 is also provided. However, as mentioned above, unlike a traditional system in which the brake assembly 110 is activated in such a way as to apply the brake directly to the wheels (e.g., rear wheels 32), example embodiments may provide the braking to a transaxle of the hydraulic motor 100. The lever mount 80 may be structured to enable the brake assembly 110 to be actuated in a way that gives a quality feel to each of the steering levers 34 over the range of motion between inboard and outboard positions, while still allowing the normal operation of the steering levers 34 for speed control by movement of the steering levers 34. Thus, while moving the lever mount 80 and corresponding steering lever 34 of either side in forward and reverse directions correspondingly operates the hydraulic motor 100 and drive wheel of the respective side, the movement of either lever mount 80 and corresponding steering lever 34 to the outboard position (e.g., moving the steering lever 34 outwardly and/or laterally away from the longitudinal centerline A of the riding lawn care vehicle 10) will engage and/or otherwise activate the brake assembly 110 for a corresponding transaxle in the respective hydraulic motor 100. In this regard, for example, the brake assembly 110 may include a gear capable of locking the transaxle of a corresponding hydraulic motor 100 when the corresponding steering lever 34 is moved outboard.

To provide the quality feel for moving the steering levers 34 from the inboard position to the outboard position, while also enabling the steering levers 34 to move forward and rearward for normal operation of the hydraulic motor 100 when the steering levers 34 are in the inboard position, a biasing assembly 82 may be provided. The biasing assembly 82 may be configured to operably couple each one of the steering levers 34 to both its respective hydraulic motor 100 and the brake assembly 110. However, the biasing assembly 82 may be further configured to positively assist movement in both directions (i.e., to and from the outboard and inboard positions) after a predetermined amount of movement has been achieved in a respective direction. Thus, for example, the biasing assembly 82 may be configured to bias the steering levers 34 toward the outboard position after the predetermined amount of movement has been made from the inboard position toward the outboard position, and to bias the steering levers 34 toward the inboard position after the predetermined amount of movement has been made from the outboard position toward the inboard position.

Of note, the brake assembly 110 is shown as a single assembly that may operate with respect to both first and second sides of the components shown in FIG. 3. However, it should be appreciated that, in some cases, the brake assembly 110 may include respective different portions that interface with each respective side. Thus, for example, the brake assembly 110 may include a first brake assembly that interfaces with a first biasing assembly (i.e., the biasing assembly 82 of one side of the block diagram of FIG. 3) and the corresponding first hydraulic motor (i.e., the hydraulic motor 100 on the same side as the first biasing assembly), and the brake assembly 110 may include a second brake assembly that interfaces with a second biasing assembly (i.e., the biasing assembly 82 of the opposite side of the block diagram of FIG. 3) and the corresponding second hydraulic motor (i.e., the hydraulic motor 100 on the same side as the second biasing assembly).

FIGS. 4-7 illustrate more detailed views of some portions of the lever mount 80 to illustrate an example embodiment. In this regard, FIG. 4, which is defined by FIGS. 4A and 4B, illustrates an isolation view of the steering levers 34 and components of the lever mount 80 from the front to show some isolated components of the lever mount 80 in accordance with an example embodiment. Of note, FIG. 4A illustrates the steering levers 34 in the outboard position and FIG. 4B illustrates the steering levers 34 in the inboard position. Meanwhile, FIG. 5, which is defined by FIGS. 5A and 5B, illustrates a perspective view of the steering levers 34 and components of the lever mount 80 in isolation in accordance with an example embodiment. In this regard, FIG. 5A illustrates the steering levers 34 in the outboard position and FIG. 5B illustrates the steering levers 34 in the inboard position. FIGS. 6A and 6B show different exploded perspective views of the connection between upper and lower pivot carriers of the lever mount 80 in accordance with an example embodiment. FIG. 7 illustrates an isolation view of biasing components associated with positioning of the steering levers 34 in accordance with an example embodiment.

Referring now to FIGS. 4-7, each of the lever mounts 80 includes an upper pivot carrier 200 to which a corresponding one of the steering levers 34 is operably coupled. In some cases, the steering lever 34 may be bolted, riveted or otherwise affixed at a lower end of the steering lever 34 to an outwardly facing, top portion of the upper pivot carrier 200. The upper pivot carrier 200 is operably coupled to a lower pivot carrier 210 at a first pivot axis 212. In an example embodiment, the upper pivot carrier 200 is configured to pivot relative to the lower pivot carrier 210 about the first pivot axis 212. The first pivot axis 212 extends substantially parallel to a longitudinal centerline of the riding lawn care vehicle 10 and substantially perpendicular to the direction of longitudinal extension of the upper pivot carrier 200. The upper pivot carrier 200 rotates or pivots about the first pivot axis 212 in the direction of arrows 214 (i.e., outboard) to move the steering levers 34 from the inboard position (shown in FIGS. 4B and 5B) to the outboard position (shown in FIGS. 4A and 5A).

The lower pivot carrier 210 is operably coupled to a frame mounting bracket 220. The frame mounting bracket 220 may be operably coupled to the frame 60 of the riding lawn care vehicle 10. Thus, for example, the frame mounting bracket 220 may be affixed to the frame 60. However, the lower pivot carrier 210 may be pivotally coupled to the frame mounting bracket 220 to rotate or pivot about a second pivot axis 222 that extends substantially perpendicular to the first pivot axis 212.

As can be appreciated from the description above, when the steering levers 34 are in the inboard (or normal operating) position, the steering levers 34 may be pushed forward or pulled rearward to rotate about the second pivot axis 222 due to pivotal rotation of the lower pivot carrier 210 about the second pivot axis 222. A neutral position may be defined for the steering levers 34 at which position the lower pivot carrier 210 rests and does not rotate relative to the frame mounting bracket 220. In some cases, the neutral position may be selectable to different positions of the steering levers 34. However, the default neutral position may correspond to a position at which the steering levers 34 extend substantially perpendicular to the ground and are not canted either slightly forward or rearward. While the steering levers 34 are in the neutral position, the steering levers 34 may be rotated to the outboard position by pivoting the upper pivot carrier 200 about the first pivot axis 212.

The lower pivot carrier 210 may be operably coupled to or otherwise include a bracket 216 that may be welded, bolted or otherwise included as part of the lower pivot carrier 210. The bracket 216 may extend below the second pivot axis 222 while part of the lower pivot carrier 210 further extends upward from the second pivot axis 222 (e.g., at least to the first pivot axis 212). The bracket 216 may therefore pivot in a direction opposite to the direction of movement of the corresponding steering lever 34. For example, if the steering lever 34 is moved forward, the bracket 216 may actually move rearward on the opposing side of the second pivot axis. The bracket 216 may be operably coupled to a linkage arm 230 that may extend between the bracket 216 and the hydraulic motor 100. In particular, a distal (or lower) end of the bracket 216 may be connected to one end of the linkage arm 230 and the opposite end of the linkage arm 230 may be connected to an input bracket provided on the hydraulic motor 100. Movement of the steering lever 34, and therefore also the linkage arm 230, may therefore correspondingly control the direction and magnitude of the input provided to the hydraulic motor 100 to control the application of drive power to the riding lawn care vehicle 10.

In an example embodiment, a damper 240 may be operably coupled between the lower pivot carrier 210 and the frame 60 in order to dampen movement of the steering levers 34 in the forward and rearward directions. The damper 240 may therefore prevent any feeling of free or loose coupling or rotation of the steering levers 34 while the steering levers 34 are in the inboard position and either at the neutral position or being operated in the forward or rearward directions.

As discussed above, the biasing assembly 82 may be configured to apply biasing for movement of the steering levers 34 to and from the outboard position. In order to accomplish this biasing, the upper pivot carrier 200 may include or otherwise be operably coupled to the biasing assembly 82. In this regard, for example, the upper pivot carrier 200 may be defined by an outer wall 300 to which the steering lever 34 is attached, and which faces outboard relative to the longitudinal centerline of the riding lawn care vehicle 10. The upper pivot carrier 200 may also include sidewalls 302 that extend inwardly and downward from the outer wall 300. The first pivot axis 212 may extend through the sidewalls 302 at a portion of the sidewalls 302 that is below a lower end of the outer wall 300. A cross member 304 may be operably coupled between lower portions of the sidewalls 302 (e.g., on an opposite side of the sidewalls 302 relative to a portion of the sidewalls 302 to which the outer wall 300 attaches). In an example embodiment, the cross member 304 may be a separate piece bolted, riveted, welded or otherwise retained at or near a distal end of the upper pivot carrier 200 relative to a proximal end thereof at which the steering levers 34 are attached.

The cross member 304 may be configured to interface with a parking brake actuation assembly 310. The parking brake actuation assembly 310 may include a cable holder 312 that is affixed to an outwardly facing wall of the lower pivot carrier 210 and to which an actuation cable 314 (e.g., a Bowden cable) is operably coupled. The actuation cable 314 may include a sheath that is fixed by the cable holder 312 and a flexible member 315 (e.g., a stranded wire or the like) that is movable within the sheath. The flexible member 315 may be operably coupled to a rod 316 that passes through an orifice provided in the cross member 304 with a brake tensioning spring 318 disposed on an opposite side of the cross member 304 relative to the cable 314 and the cable holder 312.

When the steering lever 34 is moved to the outboard position, the upper pivot carrier 200 rotates about the first pivot axis 212 to move the cross member 304 away from the lower pivot carrier 210 (responsive to outward movement of the steering lever 34 and corresponding inward movement of the cross member 304). The movement of the cross member 304 allows the rod 316 to move through the orifice in the cross member 304 to some degree while compressing the brake tensioning spring 318 against a stop (e.g., a nut, washer and/or other assembly disposed at an end of the rod 316). The movement of the cross member 304 therefore pulls on the flexible member 315 inside the actuation cable 314 via the movement of the rod 316 while compressing the brake tensioning spring 318. The flexible member 315 is operably coupled to a clevis 320 and bar 322 that is further operably coupled to a park brake return spring bracket 330 that is fixed to a portion of the riding lawn care vehicle 10 (e.g., to an engine mounting plate). The park brake return spring bracket 330 is operably coupled to the clevis 320 and bar 322 via a park brake return spring 332 and eyebolt 334.

The bar 322 includes a coupling member 323 that actuates the park brake functionality when moved responsive to movement of the flexible member 315 to move the bar in the direction of arrow 325 to activate, actuate or otherwise set the brake assembly 110. Meanwhile, when tension on the flexible member 315 is released, the park brake return spring 332 is allowed to return the bar 322 to a position corresponding to the brake assembly 110 being inactive or off by moving the bar 322 (and correspondingly also the coupling member 323) in the direction of arrow 327. Movement of the coupling member 323 physically sets the park brake via a locking member (e.g., a gear, pawl, and/or the like) that applies a locking force to the transaxle of the hydraulic motor 100.

The amount of movement of the rod 316 is limited by the brake tensioning spring 318 during compression thereof. Thus, the amount of force applied to the brake assembly 110 may be dependent, at least in part, on the tension provided by (and therefore positioning of) the brake tensioning spring 318. As such, the brake tensioning spring 318 may effectively determine the force applied to the brake assembly 110, which can therefore be set to meet any desirable regulatory or practical standards for braking force for the riding lawn care vehicle 10. The movement of the stop at the end of the rod 316 may therefore be used to set the desired amount of tension. When the steering levers 34 are moved to the inboard position, the brake tensioning spring 318 may decompress and facilitate inward movement of the steering levers 34 while the pull force on the flexible member 315 is released. The park brake return spring 332, which is extended responsive to movement of the steering levers 34 to the outboard position, will also facilitate return of the park brake return spring bracket 330 to its normal (no brake applied) position by relaxing toward its non-extended position.

As discussed above, the biasing assembly 82 may be further configured to positively assist movement of the steering levers 34 between inboard and outboard positions in both directions. To facilitate this, high spring rate compression springs 400 may be used to retain a "locked-in-feel" when the steering levers 34 are moved to the inboard position to release the brake assembly 110 (e.g., turn the park brake "off"). The compression springs 400 may be disposed at the upper pivot carrier 200 in a spring reception cavity formed between a top member 410 and a bottom member 420. The top and bottom members 410 and 420 may extend substantially perpendicularly to (and/or between) the sidewalls 302 (and the outer wall 300). The top and bottom members 410 and 420 may include orifices 412 and 422, respectively, for receiving spring mounts 430. The spring mounts 430 may pass approximately through a longitudinal centerline of each of the compression springs 400 between the top and bottom members 410 and 420 to retain the compression springs 400. A spring retention bracket 440 may be positioned proximate to one end (e.g., a top end) of the compression springs 400. A over center link 450 may be operably coupled to the spring retention bracket 440 proximate to one end of the over center link 450. An opposing end of the over center link 450 may be operably coupled to a fixing member 460. The fixing member 460 may be operably coupled to the lower pivot carrier 210 at a fixed location thereat.

In an example embodiment, the over center link 450 may have a threaded engagement with the fixing member 460 to allow the over center link 450 to be drawn further into or extended further away from the fixing member 460. Drawing the over center link 450 further into the fixing member 460 correspondingly draws the spring retention bracket 440 downward (e.g., toward the bottom member 420). Thus, the position of the spring retention bracket 440 (as determined by the over center link 450) will determine the degree to which the compression springs 400 are compressed when the steering levers 34 are in the inboard position (and the park brake is off), and the point at which the compression springs 400 switch between being compressed and extended during the transition between the inboard position and the outboard position of the steering levers 34. This will also determine the degree to which the compression springs 400 are unloaded when the steering levers 34 are moved to the outboard position (and the park brake is on), and loaded (or compressed) in the inboard position. In an example embodiment, the position of the spring retention bracket 440 (again, as determined by the over center link 450) may be located at a position at which the compression springs are mostly unloaded in the inboard position, but remain compressed enough to counterbalance the force exerted by the tensioning spring 318. Thus, the tensioning spring 318 may overcome the force of the compression springs 400 in the inboard position, but after the compression springs 400 reach the over center position during movement of the steering levers 34 to the outboard position, the compression springs 400 uncompress and facilitate movement of the steering levers 34 to the outboard position. Accordingly, in both the inboard position and the outboard position, the tensioning spring 318 and the compression springs 400 work together to give the steering lever 34 a quality feel of being biased toward the current position, with a transition point occurring during the movement from inboard to outboard positions (and vice versa) where the biasing shifts directions. Accordingly, a position of the spring retention bracket 440 defines a selectable over-center-position where a transition occurs between assisting movement of the steering lever 34 toward the inboard position and assisting movement of the steering lever 34 toward the outboard position.

Operation of the brake assembly responsive to movement of the coupling member 323 will now be described in reference to FIGS. 8-10. In this regard, FIG. 8 shows a perspective view of a hydraulic motor 500 with components of the park brake exploded in accordance with an example embodiment. FIG. 9 illustrates an exploded perspective view of a motor shaft and brake shaft in accordance with an example embodiment. FIG. 10 illustrates a partially exploded perspective view of some other portions of the motor and brake assembly in accordance with an example embodiment.

Referring now to FIGS. 8-10, the coupling member 323 is moved forward or rearward to interface with a park brake lever 510 and move the park brake lever 510 correspondingly in the directions of double arrow 512. The park brake lever 510 is operably coupled to a park brake shaft 520, which rotates responsive to movement of the park brake lever 510. A puck cam 530 is operably coupled to the park brake shaft 520 to correspondingly move with the park brake shaft 520 and interface with a brake disc 540 that is operably coupled to a motor shaft 550 of the motor 500. When positioned by the movement of the park brake shaft 520, the puck cam 530 can alternately allow or prevent interaction between the brake disc 540 and a gear 560 that is operably coupled to the motor shaft 550 to allow (when there is no interaction) or prevent (when there is interaction) movement of the motor shaft 550. When the gear 560 engages the brake disc 540, the motor shaft 550 is not allowed to turn and the park brake is set or on. When the gear 560 is not engaged with the brake disc 540, then the motor shaft 550 is allowed to turn freely based on operation of the steering levers 34 forward and rearward in the inboard position.

Accordingly, some example embodiments may enable movement of either steering lever to be assisted in both inward and outward direction to control the application of a parking brake or other brake assembly to either of the drive wheels of a mower such as a zero turn mower. In an example embodiment, a riding lawn care vehicle may therefore be provided. The riding lawn care vehicle may include a frame, a steering assembly, a first brake assembly, and a first biasing assembly. A first drive wheel and a second drive wheel of the riding lawn care vehicle may be attachable to the frame. The steering assembly may include a first steering lever and a second steering lever. The first and second steering levers may be operably coupled to corresponding ones of the first and second drive wheels via a first hydraulic motor and a second hydraulic motor, respectively, to facilitate turning of the riding lawn care vehicle based on drive speed control of the first and second drive wheels responsive to positioning of the first and second steering levers to control the first and second hydraulic motors. The first brake assembly may be operably coupled to the first hydraulic motor to enable a braking force to be selectively applied to a motor shaft of the first hydraulic motor responsive to movement of the first steering lever from an inboard position to an outboard position. The first biasing assembly may be configured to positively assist movement of the first steering lever between the inboard and outboard positions in both directions.

The riding lawn care vehicle (or biasing assembly) of some embodiments may include additional features that may be optionally added either alone or in combination with each other. For example, in some embodiments, (1) each of the first and second steering levers may be operably coupled to a lever mount (e.g., a first lever mount and a second lever mount). The biasing assembly (which should be understood to correspond with one side or the other of the vehicle and therefore either be a first or second biasing assembly) may be operably coupled to the brake assembly (again associated with a respective side of the vehicle), and the biasing assembly may be a portion of or operably coupled to the lever mount. In some cases, (2) the lever mount may include an upper pivot carrier, a lower pivot carrier and a frame mounting bracket. A respective one of the first and second steering levers may be operably coupled to the upper pivot carrier. The upper pivot carrier may pivot relative to the lower pivot carrier about a first pivot axis responsive to movement of the respective one of the first and second steering levers between the inboard and outboard positions. The lower pivot carrier may pivot relative to the frame mounting bracket about a second pivot axis responsive to movement of the respective one of the first and second steering levers forward or rearward while in the inboard position. In an example embodiment, (3) the first pivot axis may be located proximate to one end of the lower pivot carrier and the second pivot axis may be located at an opposite end of the lower pivot carrier. In some examples, (4) the biasing assembly may include one or more compression springs disposed at a portion of the upper pivot carrier. The one or more compression springs may have a selectable over-center-position forming a transition between the biasing assembly biasing the respective one of the first and second steering levers toward the inboard position on a first side of the selectable over-center-position and toward the outboard position on a second side of the selectable over-center-position. In an example embodiment, (5) the one or more compression springs may have a longitudinal axis that is substantially parallel to a longitudinal axis of the upper pivot carrier. A spring retention bracket may be operably coupled to the one or more compression springs to set the selectable over-center-position based on a position of an over center link operably coupled between the spring retention bracket and the lower pivot carrier. In some examples, (6) the selectable over-center-position may be determined based on a degree to which the over center link is inserted in a fixing member operably coupled to the lower pivot carrier. In an example embodiment, (7) the biasing assembly may further include a tensioning spring configured to bias the respective one of the first and second steering levers toward the inboard position and apply tension to the brake assembly to apply the braking force to the motor shaft. In some examples, (8) the tensioning spring may be operably coupled to a rod that passes through a cross member disposed between sidewalls of the upper pivot carrier. The rod may be operably coupled to a flexible member that is operably coupled to a coupling member that actuates the brake assembly. In an example embodiment, (9) the flexible member may be moved by the rod against a parking brake return spring disposed between the coupling member and an engine mounting plate.

In some embodiments, any or all of (1) to (9) may be employed in addition to the optional modifications or augmentations described below. For example, in some embodiments, the lower pivot carrier may be operably coupled to a damper configured to dampen movement of the respective one of the first and second steering levers forward or rearward while in the inboard position.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A riding lawn care vehicle comprising:
a frame operably coupled to a first drive wheel and a second drive wheel;
a steering assembly comprising a first steering lever and a second steering lever, wherein the first and second steering levers are operably coupled to corresponding ones of the first and second drive wheels via a first hydraulic motor and a second hydraulic motor, respectively, to facilitate turning of the riding lawn care vehicle based on drive speed control of the first and second drive wheels responsive to positioning of the first and second steering levers to control the first and second hydraulic motors;
a first brake assembly operably coupled to the first hydraulic motor to enable a braking force to be selectively applied to a motor shaft of the first hydraulic motor responsive to movement of the first steering lever from an inboard position to an outboard position;
a first biasing assembly configured to positively assist movement of the first steering lever between the inboard and outboard positions in both directions,
wherein the first steering lever is operably coupled to a first lever mount,
wherein the first biasing assembly is operably coupled to the first brake assembly,
wherein the first biasing assembly is a portion of or operably coupled to the first lever mount,
wherein the first lever mount comprises an upper pivot carrier, a lower pivot carrier and a frame mounting bracket,
wherein the first steering lever is operably coupled to the upper pivot carrier,
wherein the upper pivot carrier pivots relative to the lower pivot carrier about a first pivot axis responsive to movement of the first steering lever between the inboard and outboard positions, and
wherein the lower pivot carrier pivots relative to the frame mounting bracket about a second pivot axis responsive to movement of the first steering lever forward or rearward while in the inboard position.

2. The riding lawn care vehicle of claim 1, wherein the first biasing assembly comprises one or more compression springs disposed at a portion of the upper pivot carrier, the one or more compression springs having a selectable over-center-position forming a transition between the biasing assembly biasing the first steering lever toward the inboard position on a first side of the selectable over-center-position and toward the outboard position on a second side of the selectable over-center-position,
wherein the first pivot axis is located proximate to one end of the lower pivot carrier and the second pivot axis is located at an opposite end of the lower pivot carrier, and
wherein the lower pivot carrier is operably coupled to a damper configured to dampen movement of the respective one of the first and second steering levers forward or rearward while in the inboard position.

3. The riding lawn care vehicle of claim 2, wherein the one or more compression springs have a longitudinal axis that is substantially parallel to a longitudinal axis of the upper pivot carrier, and wherein a spring retention bracket is operably coupled to the one or more compression springs to set the selectable over-center-position based on a position of an over center link operably coupled between the spring retention bracket and the lower pivot carrier.

4. The riding lawn care vehicle of claim 3, wherein the selectable over-center-position is determined based on a degree to which the over center link is inserted in a fixing member operably coupled to the lower pivot carrier.

5. The riding lawn care vehicle of claim 2, wherein the first biasing assembly further comprises a tensioning spring configured to bias the first steering lever toward the inboard position and apply tension to the first brake assembly to apply the braking force to the motor shaft.

6. The riding lawn care vehicle of claim 5, wherein the tensioning spring is operably coupled to a rod that passes through a cross member disposed between sidewalls of the upper pivot carrier,
wherein the rod is operably coupled to a flexible member that is operably coupled to a coupling member that actuates the first brake assembly.

7. The riding lawn care vehicle of claim 6, wherein the flexible member is moved by the rod against a parking brake return spring disposed between the coupling member and an engine mounting plate, and
wherein the riding lawn care vehicle is a zero turn mower.

8. The riding lawn care vehicle of claim 1, further comprising:
a second brake assembly operably coupled to the second hydraulic motor to enable a braking force to be selectively applied to a second motor shaft of the second hydraulic motor responsive to movement of the second steering lever from the inboard position to the outboard position; and
a second biasing assembly configured to positively assist movement of the second steering lever between the inboard and outboard positions in both directions.

9. A biasing assembly of a riding lawn care vehicle, wherein the riding lawn care vehicle further comprises first and second drive wheels, first and second steering levers, first and second hydraulic motors, and first and second brake assemblies, wherein the first and second brake assemblies are operably coupled to the first and second hydraulic motors, respectively, to enable a braking force to be selectively applied to a motor shaft of the first and second hydraulic motors responsive to movement of the first and second steering levers, respectively, from an inboard position to an outboard position, and wherein the riding lawn care vehicle is steerable via the first and second steering levers to facilitate turning of the riding lawn care vehicle based on drive speed control of the first and second drive wheels responsive to positioning of the first and second steering levers while in the inboard position,
wherein the biasing assembly comprises a first portion configured to positively assist movement of the first steering lever from the inboard to the outboard position, and a second portion configured to positively assist movement of the first steering lever from the outboard to the inboard position,
wherein the first steering lever is operably coupled to a first lever mount,
wherein the biasing assembly is operably coupled to the first brake assembly,
wherein the biasing assembly is a portion of or operably coupled to the first lever mount,
wherein the first lever mount comprises an upper pivot carrier, a lower pivot carrier and a frame mounting bracket,
wherein the first steering lever is operably coupled to the upper pivot carrier,
wherein the upper pivot carrier pivots relative to the lower pivot carrier about a first pivot axis responsive to movement of the first steering lever between the inboard and outboard positions, and wherein the lower pivot carrier pivots relative to the frame mounting bracket about a second pivot axis responsive to movement of the first steering lever forward or rearward while in the inboard position.

10. The biasing assembly of claim 9, wherein the first pivot axis is located proximate to one end of the lower pivot carrier and the second pivot axis is located at an opposite end of the lower pivot carrier.

11. The biasing assembly of claim 9, further comprising one or more compression springs disposed at a portion of the upper pivot carrier, the one or more compression springs having a selectable over-center-position forming a transition between the biasing assembly biasing the respective one of the first and second steering levers toward the inboard position on a first side of the selectable over-center-position and toward the outboard position on a second side of the selectable over-center-position.

12. The biasing assembly of claim 11, wherein the one or more compression springs have a longitudinal axis that is substantially parallel to a longitudinal axis of the upper pivot carrier, and wherein a spring retention bracket is operably coupled to the one or more compression springs to set the selectable over-center-position based on a position of an over center link operably coupled between the spring retention bracket and the lower pivot carrier, or wherein the biasing assembly further comprises a tensioning spring configured to bias the first steering lever toward the inboard position and apply tension to the first brake assembly to apply the braking force to the motor shaft.

13. The biasing assembly of claim 12, wherein the selectable over-center-position is determined based on a degree to which the over center link is inserted in a fixing member operably coupled to the lower pivot carrier.

14. The biasing assembly of claim 11, wherein the tensioning spring is operably coupled to a rod that passes through a cross member disposed between sidewalls of the upper pivot carrier, wherein the rod is operably coupled to a flexible member that is operably coupled to a coupling member that actuates the first brake assembly.

15. The biasing assembly of claim 14, wherein the flexible member is moved by the rod against a parking brake return spring disposed between the coupling member and an engine mounting plate, and wherein the lower pivot carrier is operably coupled to a damper configured to dampen movement of the first steering lever forward or rearward while in the inboard position.

16. The biasing assembly of claim 9, wherein the second brake assembly is operably coupled to the second hydraulic motor to enable a braking force to be selectively applied to a second motor shaft of the second hydraulic motor responsive to movement of the second steering lever from the inboard position to the outboard position; and wherein the biasing assembly further comprises a second biasing assembly configured to positively assist movement of the second steering lever between the inboard and outboard positions in both directions.

* * * * *